Feb. 14, 1961 J. V. VOGEL 2,971,377
METERING APPARATUS
Filed July 16, 1958 4 Sheets-Sheet 1

INVENTOR:
JOHN V. VOGEL
BY: *A. H. McCarthy*
HIS AGENT

Feb. 14, 1961  J. V. VOGEL  2,971,377
METERING APPARATUS

Filed July 16, 1958  4 Sheets-Sheet 3

INVENTOR:
JOHN V. VOGEL
BY: J. H. McCarthy
HIS AGENT

Feb. 14, 1961 J. V. VOGEL 2,971,377
METERING APPARATUS
Filed July 16, 1958 4 Sheets-Sheet 4

INVENTOR:
JOHN V. VOGEL
BY: *J. H. McCarthy*
HIS AGENT

United States Patent Office 2,971,377
Patented Feb. 14, 1961

2,971,377
METERING APPARATUS

John V. Vogel, Kilgore, Tex., assignor to Shell Oil Company, a corporation of Delaware Filed July 16, 1958, Ser. No. 748,951

4 Claims. (Cl. 73—224)

The present invention relates to apparatus for metering liquids and pertains more particularly to an apparatus for accurately measuring successive volumes of liquid by what is known as the "batch" method.

In oil fields and other installations it is often necessary to measure the volume of a fluid being handled or produced. Since, in many oil fields, gas is often produced along with the oil from the wells, considerable error may be introduced into metering measurements if a positive displacement meter is employed. Therefore, it is a common practice in many installations to employ a metering tank in which a predetermined volume of liquid is metered between two levels.

In general, the apparatus employed for metering in a tank comprises a tank with liquid level indicating devices installed near the top and the bottom of the tank. The liquid level sensing devices are connected through a suitable control circuit to actuate valves in the inlet and outlet lines of the tank whereby the tank is repeatedly filled and emptied between the upper and lower level indicating devices.

A primary object of the present invention is to provide an apparatus for accurately measuring or metering repeatedly a predetermined constant volume of fluid which is subsequently delivered to storage tanks or to a pipeline.

A further object of the present invention is to provide a simplified apparatus having a minimum of component parts for automatically and repeatedly measuring predetermined volumes of a liquid.

Due to the turbulent motion of the fluid level in a rapidly filling or emptying vessel equipped with upper and lower float switches, the level at which a float switch is actuated may vary as much as one inch. This inconsistency results in an appreciable volume error across the area of the vessel. It is, therefore, an additional object of this invention to provide means for accurately measuring the upper and lower liquid levels of a constant volume chamber so that any error caused by the liquid level sensing device would be negligible as compared with the volume of the fluid metered in the constant volume chamber.

These and other objects of this invention will be understood from the following description taken with reference to the drawing, wherein.

Figure 1:
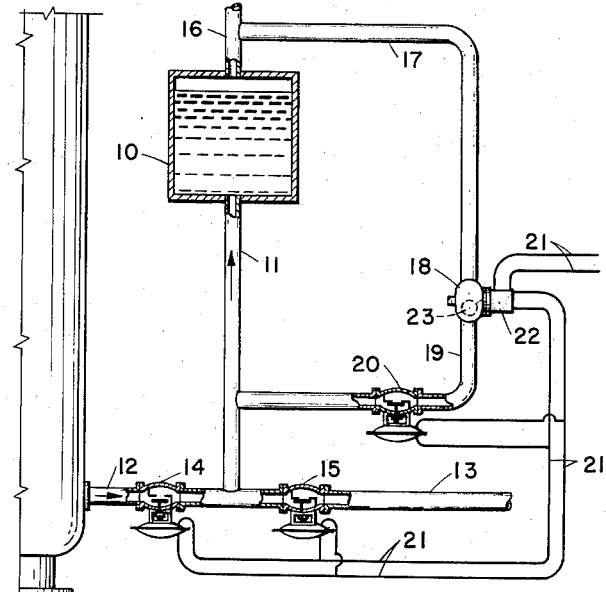
Figure 1 is a schematic view illustrating the component parts of the present system when the volume chamber of the system is being filled.

Referring to Figure 1 of the drawing, the metering apparatus of the present invention comprises a closed tank 10 having common inlet and outlet conduit means 11 in communication therewith. The common conduit means 11 is connected to an inlet line 12 and an outlet line 13. Control valves 14 and 15 are positioned in the inlet and outlet lines 12 and 13, thus becoming the inlet and outlet valves. Preferably, the tank 10 is provided with a vent or equalizer line 16 extending from the top thereof through which separated gases may escape. If desired, separate inlet and outlet conduits to the tank may be employed. Preferably, the outlet extends from the bottom of the tank but it may also extend through the side wall of the tank.

The tank 10 is provided with an overflow line 17 which is in communication with the tank 10 through a portion of the vent line 16. The other end of the overflow line 17 is in communication with the top of a liquid level sensing device 18 of any type well-known to the field of control instruments. Thus the overflow line 17 from the tank becomes the fluid inlet line into the liquid level sensing device 18. A discharge conduit 19 extends from the bottom of the liquid level sensing device 18 and is in communication with the outlet conduit 11 from said tank 10 at a level below the sensing device 18, unless a differential pressure device is used and then it may be above the sensing device. The discharge conduit 19 is provided with a valve 20 for controlling the fluid flow therethrough.

Valve 20 serves as a pressure equalizing valve in conduits 19 and 11 between the liquid level sensing device 18 and the tank 10 to equalize the hydrostatic head therebetween when the tank 10 is being drained. At all other times valve 20 is closed, thus serving to trap any liquid in conduit 19. The equalizing valve 20 is shown as being a power-actuated valve but in its simplest form may be merely a check valve of any unidirectional valve which prevents flow of fluid from conduit 11 into conduit 19 and into sensing device 18 when the tank 10 is being filled.

The inlet and outlet valves 14 and 15, respectively, are shown as air-actuated diaphragm valves, for purposes of illustration. The air supplied to the valves 14, 15 and 20 is supplied through power transmission lines 21. A pilot valve or switch 22, fixedly secured to and actuated by the float 23 in said liquid level sensing device 18, governs the flow of power fluid (air pressure) to the valves to actuate them in one direction or the other, as the float 23 raises and lowers and thus opens and closes pilot 22.

Although valves 14, 15 and 20 are illustrated as air-actuated valves, they may be also actuated electrically, mechanically or hydraulically in a manner well known to the art. Thus, for example, if valves 14, 15 and 20 were of the solenoid type, instead of a valve, an electrical switch, preferably of the mercury type, would be employed as the pilot 22 and the power transmission leads 21 would be in the form of electrical conductors for leading current to operate the valves, rather than in the form of hydraulic tubing leading an air supply to the valves to operate them. As mentioned above, valve 20 could be a check valve so that the pilot 22 would only be employed to control inlet and outlet valves 14 and 15. Likewise, instead of having separate inlet and outlet valves 14 and 15, a single three-way valve having inlet and outlet ports could be employed. Since three-way valves of this type are well known to the art and do not form a port of this invention, they will not be further described here.

Any suitable type of liquid level sensing device 18 may be employed. For example, float-operated liquid level controllers, floatless liquid level controllers, float switches, probe-type electric liquid level controllers, differential pressure switches, etc. may all be employed to actuate a pilot valve or electric switch at 22. Since all these types of liquid level sensing devices are well known to the art and since their particular construction and operation does not form part of this invention, they will not be further described here.

As illustrated in Figure 1, the upper liquid level in the present apparatus is determined by the horizontal level at which the overflow line 17 communicates with the vent line 16 or tank 10, while the lower level is determined by the position of the liquid level sensing device 18. For precise measurement it is essential that the liquid level sensing device 18 be positioned below the bottom of the tank 10 so that the lower liquid level is within the inlet-outlet line 11 whose diameter is considerably smaller than that of the tank 10, thus providing for a more accurate cutoff of the measured volume. Preferably, the liquid level sensing device 18 is positioned at the level of a vertical portion of conduit 11 to achieve greater accuracy of measurement. With the apparatus shown in Figure 1, the tank 10, the portion of conduit 11 above the liquid level sensing device 18 and the portion of conduit 16 below the overflow line 17 define a chamber of constant volume. This volume of fluid is metered each time that the apparatus is filled and emptied.

Figure 2:
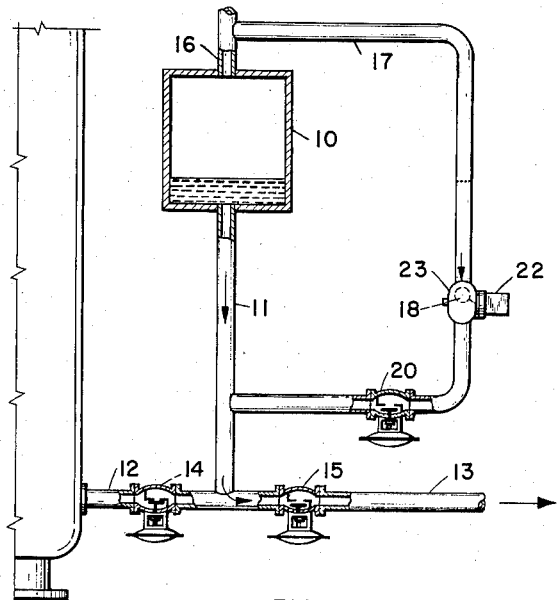
Figure 2 is a schematic view illustrating the equipment of Figure 1 when the system is being drained.

In the meter filling operation as illustrated in Figure 1, inlet valve 14 is opened while outlet valve 15 and equalizing valve 20 are closed. Fluid from any source flows from conduit 12 up conduit 11 filling tank 10 until fluid passes out line 16 and overflows through the overflow line 17 into the liquid level sensing device 18. In the event that conduit 19 is empty, which is not the normal case, fluid would fill conduit 19 and then as the liquid rose in the housing of the liquid level sensing device 18, the pilot 22 would be actuated to close valve 14 while simultaneously opening valve 15 and also valve 20, unless valve 20 was a check valve. With outlet valve 15 open, liquid would drain from the tank 10 and from the sensing device 18 until the liquid level in conduit 11 and sensing device 18 was at the lower level, at which time valve 14 would again be opened while valves 15 and 22 were simultaneously closed. Figure 1 illustrates the position of the valves during the filling cycle while Figure 2 illustrates the position of the valves during the emptying cycle.

Measuring accuracy is achieved in the present metering apparatus due to the fact that the upper liquid level is weir controlled, while the lower liquid level is controlled in a portion of the constant volume chamber having a reduced cross-section. Accuracy of measurement at the upper and lower levels depends on the speed of the controls and the size of the conduit 11.

Figure 3:
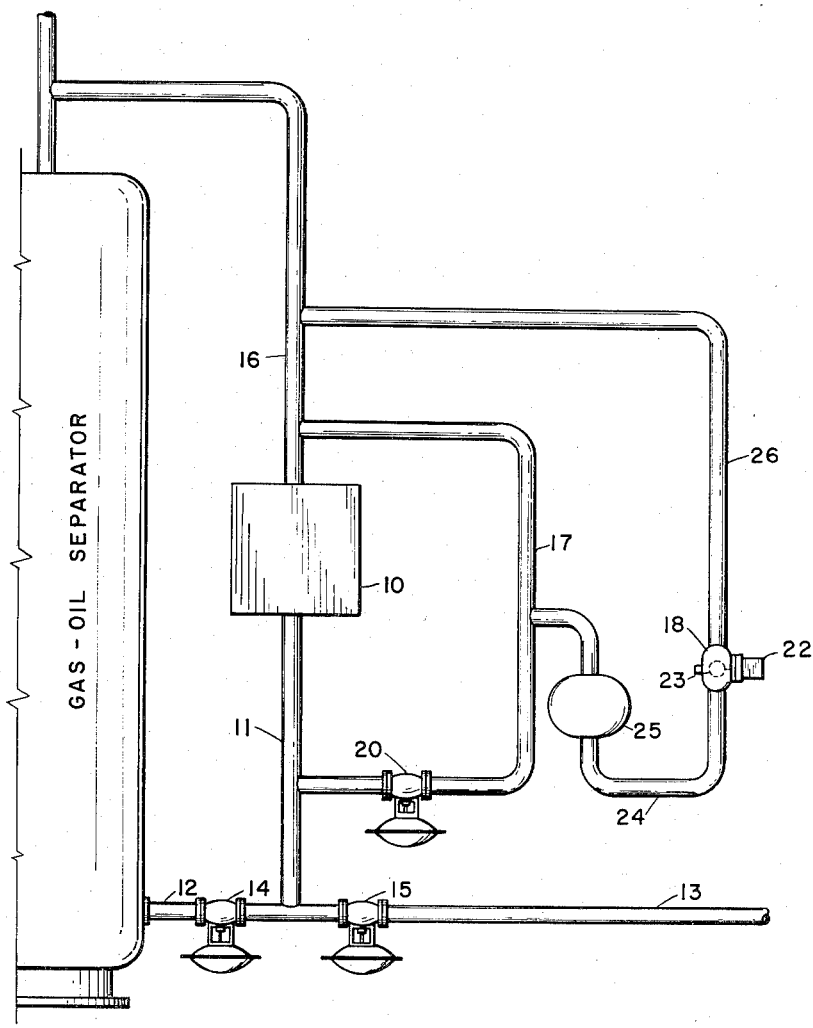
Figure 3 is a schematic view showing the component parts of the present metering apparatus when employed in metering a corrosive liquid.

A modification of the present metering apparatus is shown in Figure 3 which is the preferred arrangement when corrosive fluids are being metered. In this form of the apparatus a U-tube 24 and chamber 25 are filled with a non-corrosive and non-viscous fluid seal, one end of the U-tube 24 being connected to the bottom of the liquid level sensing device 18, while the top of the chamber 25 is in communication with vent line 16 from the tank 10. During the filling cycles of this metering apparatus, fluid flows into overflow line 17 and into the top of the chamber 25 causing the non-corrosive fluid therein to be pushed through the U-tube 24 into the liquid level sensing device 18 so as to raise the float 23 and open outlet valve 15 and equalizing valve 20 to empty the apparatus. At no time is the liquid level sensing device exposed to the corrosive liquid.

From a study of Figures 4 through 10, it may be seen that many variations in the arrangement of the piping between the component parts of the present metering apparatus may be setup. In all of the arrangements the tank 10 must be provided with an inlet valve, an outlet valve and an equalizing valve which enables a simple liquid level sensing device to control both the upper and lower levels of fluid in the metering apparatus.

Figure 4:
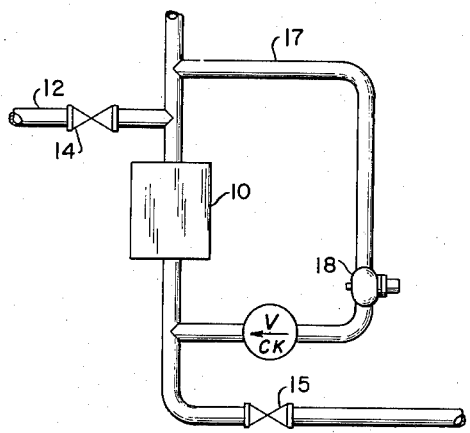
Figures 4, 5, 6 and 7 are schematic views showing alternative arrangements of the components of the present metering system.
Figure 5:
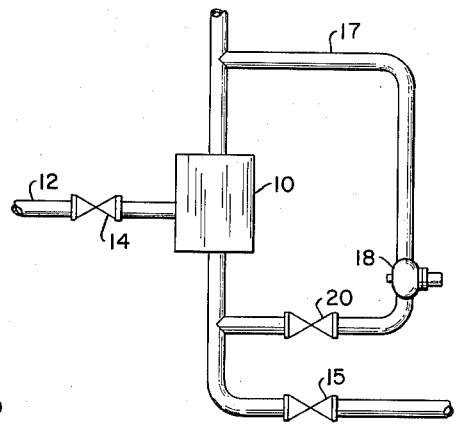
Figure 6:
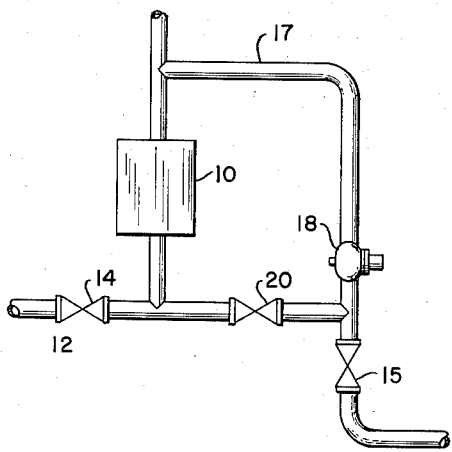
Figure 7:
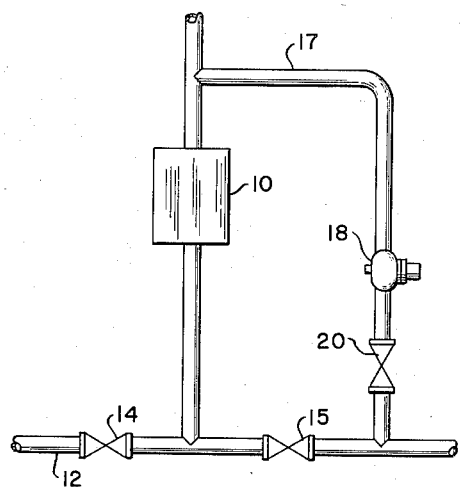
Figure 8:
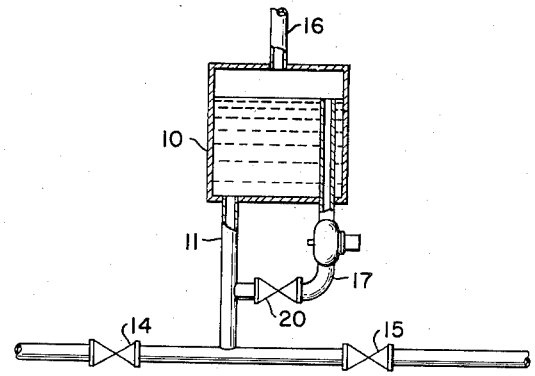
Figures 8, 9 and 10 are schematic views illustrating alternative arrangement of piping of the present metering apparatus when it is planned to utilize only a portion of the metering tank.
Figure 9:
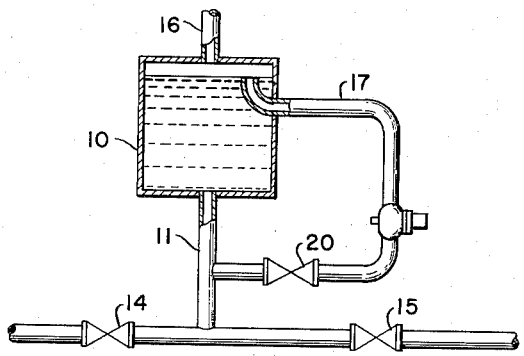
Figure 10:
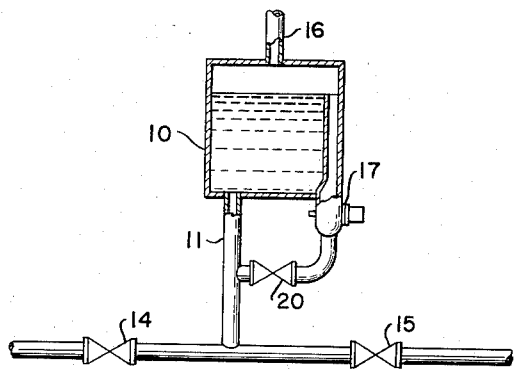

The arrangement of the apparatus of Figure 4 differs from that of Figure 1 in that the liquid inlet line 12 enters the top of the tank 10. In Figure 5 the inlet line 12 enters through one side of tank 10. In Figures 6 and 7 the placement of the outlet valve 15 and the equalizing valve 20 are changed slightly from the arrangement of Figure 1. In Figures 8, 9 and 10 the main change in the equipment is that the overflow line 17 is arranged to have entrance at a preselected level within the tank 10 rather than coming out of the top of the tank or being connected to the vent line 16.

I claim as my invention:

1. Apparatus for metering a constant volume of liquid which comprises a tank, inlet conduit means to said tank, outlet conduit means from said tank, vent means open at all times and leading from the top of said tank for maintaining a constant pressure above any fluid therein, overflow conduit means from said tank, a single liquid-level sensing device positioned adjacent said tank at a level below the inlet end of said tank outlet conduit means, said sensing device being in open communication with the overflow conduit means from said tank, a discharge conduit from said sensing device in communication with said outlet conduit means from said tank at a level below said sensing device, valve means in said inlet and in said outlet conduit means from said tank, power transmission means operatively connecting said liquid-level sensing means to said valve means in both said inlet and said outlet conduit means to open one of said valve means at a time while closing the other of said valve means, and pressure-equalizing valve means in said discharge conduit from said sensing device for equalizing the hydrostatic head between said sensing device and said tank when liquid is being drained therefrom.

2. Apparatus for metering a constant volume of liquid which comprises a tank, inlet conduit means to said tank, outlet conduit means from said tank, at least a portion of said tank and said conduit means defining a chamber of constant volume, vent means open at all times and leading from the top of said chamber for maintaining a constant pressure above any fluid therein, overflow conduit means from said tank, the uppermost portion of said overflow line being at the top level of said constant volume chamber, a single liquid-level sensing device positioned adjacent said tank at a level below the inlet end of said tank outlet conduit means, said tank outlet conduit means having a substantially vertical portion at the level of said liquid level sensing device, an inlet conduit into said sensing device connected to the overflow conduit means from said tank, a discharge conduit from said sensing device in communication with said outlet conduit means from said tank at a level below said sensing device, valve means in said inlet and in said outlet conduit means from said tank, power transmission means operatively connecting said liquid-level sensing means to said valve means in both said inlet and said outlet conduit means to open one of said valve means at a time while closing the other of said valve means, and pressure-equalizing valve means in said discharge conduit from said sensing device for equalizing the hydrostatic head between said sensing device and said tank when liquid is being drained therefrom.

3. Apparatus for metering a constant volume of liquid which comprises a tank, inlet conduit means to said tank, outlet conduit means from said tank, at least a portion of said tank and said conduit means defining a chamber of constant volume, vent means open at all times and leading from the top of said chamber for maintaining a constant pressure above any fluid therein, overflow conduit means from said tank, the uppermost portion of said overflow lines being at the top level of said constant volume chamber, a single liquid-level sensing device positioned adjacent said tank at a level below the inlet end of said tank outlet conduit means, said tank outlet conduit means having a substantially vertical portion at the level of said liquid level sensing device, an inlet conduit into said sensing device connected to the overflow conduit means from said tank, a discharge conduit from said sensing device in communication with said outlet conduit means from said tank at a level below said sensing device, valve means in said inlet and in said outlet conduit means from said tank, power transmission means operatively connecting said sensing means and said valve means in both said inlet and said outlet conduit means to open one of said valve means at a time while closing the other of said valve means, and unidirectional valve means in said discharge conduit from said sensing device for equalizing the hydrostatic head between said sensing device and said tank when liquid is being drained therefrom.

4. Apparatus for metering a constant volume of liquid which comprises a tank, inlet conduit means to said tank, outlet conduit means from said tank, at least a portion of said tank and said conduit means defining a chamber of constant volume, vent means open at all times and leading from the top of said chamber for maintaining a constant pressure above any fluid therein, overflow conduit means from said tank, the inlet to said overflow line being at the top level of said constant volume chamber, a single liquid-level sensing device positioned adjacent said tank at a level below the inlet end of said tank outlet conduit means, said tank outlet conduit means having a substantially vertical portion at the level of said liquid level sensing device, an inlet conduit into said sensing device connected to the overflow conduit means from said tank, a discharge conduit from said sensing device in communication with said outlet conduit means from said tank at a level below said sensing device, a first power-actuated valve in said inlet conduit means, a second power-actuated valve in said outlet conduit means, power transmission means operatively connecting said first and second valves with said sensing means, a pilot fixedly secured to said sensing means and operated thereby on change of liquid level within said sensing means, said pilot being operatively connected into said power transmission line to said valves, one of said valves being opened while the other is closed, and pressure equalizing valve means in said discharge conduit from said sensing device for equalizing the hydrostatic head between said sensing device and said tank when liquid is being drained therefrom.

References Cited in the file of this patent

UNITED STATES PATENTS

| | | |
|---|---|---|
| 826,221 | Blessing | July 17, 1906 |
| 2,794,342 | Franklin | June 4, 1957 |